FIG. 1 (PRIOR ART)
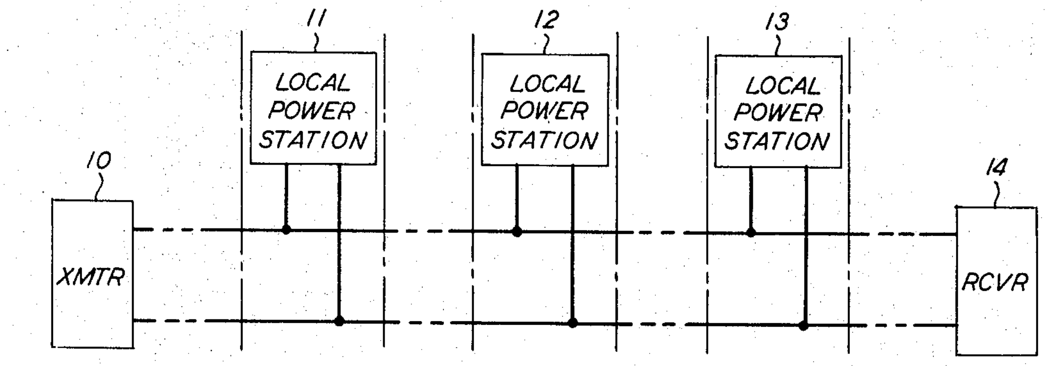
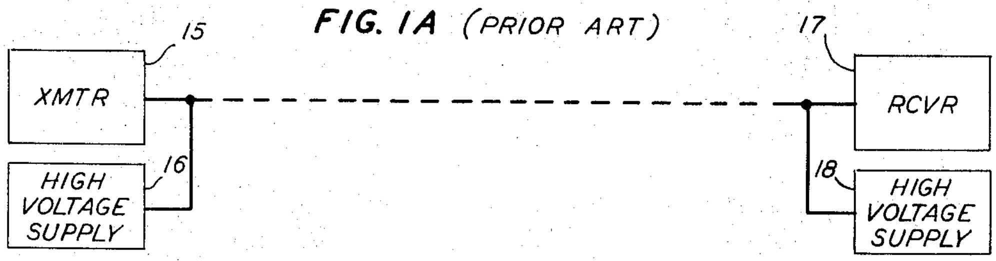
FIG. 2 (PRIOR ART)
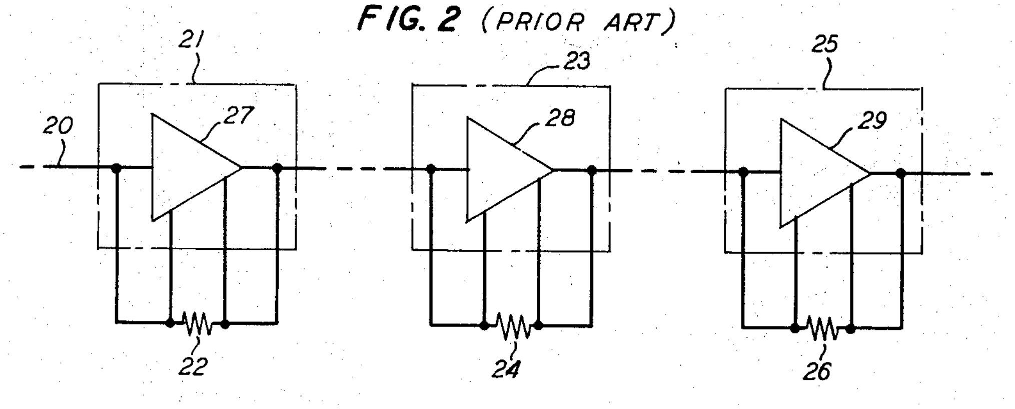
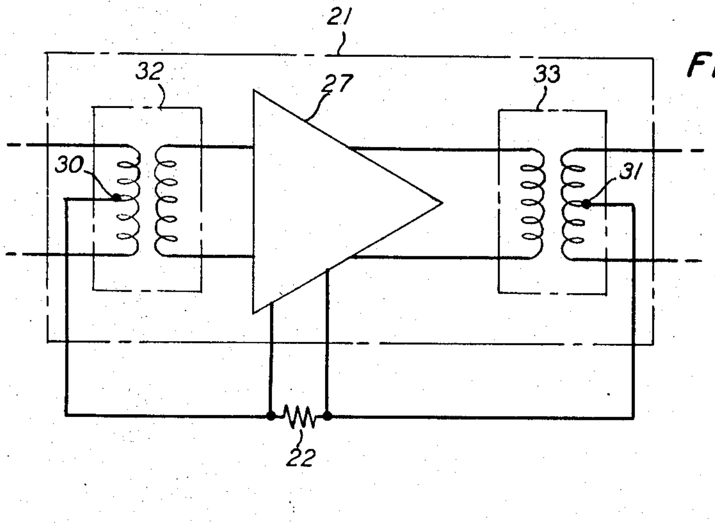
FIG. 3 (PRIOR ART)
INVENTORS
H. S. BABBITT, III
B. H. HAMILTON
BY R. B. Ardis
ATTORNEY United States Patent Office 3,535,472
Patented Oct. 20, 1970

3,535,472

REPEATERED CABLE TRANSMISSION SYSTEMS UTILIZING DC TO DC CONVERTERS

Howard S. Babbitt III, Parsippany, and Billy H. Hamilton, Summit, N.J., assignors to Bell Telephone Laboratories, Incorporated, Murray Hill and Berkeley Heights, N.J., a corporation of New York Filed July 21, 1967, Ser. No. 655,113
Int. Cl. H04b 3/44
U.S. Cl. 179—170 6 Claims

ABSTRACT OF THE DISCLOSURE

A cable transmission system is disclosed which includes a number of repeater sections along its length. The cable carries the transmitted information while simultaneously carrying DC power for each repeater. A DC to DC converter is connected to the power input circuit of each repeater to modify the power input circuit resistance and an additional DC to DC converter is connected in each repeater section in the transmission path to increase the power available to each repeater by drawing more power from each power feed station and decreasing the $I^2R$ loss along the transmission path.

BACKGROUND OF THE INVENTION

This invention relates to cable transmission systems and, in particular, to repeatered transmission lines carrying the transmitted information while simultaneously carrying DC power for its repeaters.

Long line cable carrier systems are used to transmit information great distances. Since the transmitted signal experiences loss and distortion during transmission due to the cable impedance, repeaters are inserted in the transmission path which compensate for these losses.

The repeaters, in part, are amplifiers which require DC power. For land based transmission, this DC power may be supplied by power feed stations located a distance from each other while underwater intercontinental cable systems are supplied with power at each end. In both systems, the DC power carried along with the transmitted information. At the input of each repeater station, the DC signal is separated from the transmitted signal and supplied to the repeater and, at the output, the DC signal is joined with the transmitted signal.

The amount of power drawn from the power feed station is limited by the total impedance of the cable and repeaters supplied by the station. More power could be drawn from each power feed station if the voltage supplied were increased. Supplying higher voltages to the transmission line than are presently supplied is not feasible in view of the cable breakdown voltage, voltage rating of the components along the line, and personnel safety considerations. If more power could be drawn from the power feed stations, more repeaters could be supplied by the station, thus extending the range supplied by the power station. In the alternative, if the range is not increased, then the power available to each repeater would be increased. Currently, for example, some repeatered transmission lines are powered by power feed stations located every 160 miles. Increasing the length of repeatered transmission line (more repeaters) supplied by each power feed station would permit decreasing the number of stations needed for long line transmission systems.

The DC power carried by the line is supplied to each repeater through its power input circuit. Due to the mismatch between the cable resistance and the input resistance of the power input circuit, the power transferred to the repeater is not maximized; consequently, available power is unused.

Additional power is consumed by the $I^2R$ losses of the cable and repeater. Since the cable and repeater power input circuits are conencted in series with the power feed station, the current through each of the power dissipating elements is the same. A decrease in the power consumption by these power dissipating elements would enable more power to be available for each repeater. In the alternative, more repeaters could be supplied by each power feed station.

With transmission systems handling increasing bandwidth signals, these power considerations become critical because spacing between power stations will have to decrease or these stations will need to supply higher voltages in order to meet the additional power requirements.

Both of these alternatives are undesirable. Decreasing the distance between power feed stations requires increasing the number of power stations for similar transmission distances. This is undesirable in view of the complexity, cost, and decreased reliability attendant the use of additional power feed stations. Supplying higher voltages to the transmission line than are presently supplied is also undesirable for the previously stated reasons.

Other possibilities have been suggested for increasing the power available to the repeaters. These include the addition of separate conductors to carry the DC power and the use of self-contained power sources assocaited with each repeater. Both of these possibiilties are undesirable due to their relatively high cost.

The problem of power dissipation in cable transmission systems is even more critical in underwater systems since the above alternatives become even more undesirable or even impracticable in the underwater environment.

It is, therefore, an object of the present invention to increase the power available to each repeater.

An additional object of the present invention is to permit the distance between power stations which supply DC power to the transmission line to be increased.

Another object of the present invention is to increase the distance between power stations and simultaneously increase the power available to each repeater.

A further object of the present invention is to draw more power from each local power station.

A further object of the present invention is to reduce the power dissipated by the cable resistance and repeater power input circuit.

SUMMARY OF THE INVENTION

In accordance with the present invention, these objects are accomplished by utilizing DC to DC converters which change current, voltage, and impedance levels. A DC to DC converter may be associated with the power input circuit of each repeater so that the input resistance of the power input circuit may be modified.

An additional DC to DC converter may be associated with each repeater stage. It serves to boost the voltage to the maximum permissible for line transmission while decreasing the current supplied to the next stage. The modified repeater power circuit input impedance is connected in series with the input impedance of the additional DC to DC converter. These last two impedances may match the cable resistance and maximize the power transferred to the repeater and additional converter. Since each additional converter serves as a local power source in that it provides a current and voltage to the next repeater section, the resistance relationships may be fixed accordingly in order to transfer maximum power to the following repeater section.

The additional shunt converter used with the first repeater stage following the local power feed station permits more power to be drawn from the power station due to the decrease in impedance presented to it. Without the additional shunt converter, the impedance presented to the power station is the series connection of all the repeater sections and cable resistance. The additional DC to DC converter used with the first repeater section effectively isolates all the repeater sections and cable resistance following the first repeater section. Therefore, more power may be drawn from the power station due to the decreased impedance it serves.

BRIEF DESCRIPTION OF THE DRAWINGS

FIG. 1 illustrates a typical long line land based transmission system.

FIG. 1A illustrates a typical submarine cable transmission system.

FIG. 2 illustrates a series of prior art repeaters used in the type of transmission systems depicted in FIGS. 1 and 1A.

FIG. 3 is a more detailed illustration of a single prior art repeater of the type used in FIG. 2.

DETAILED DESCRIPTION

Figure 4:
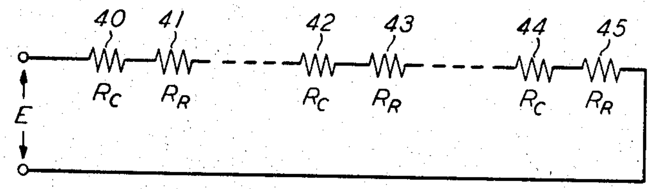
FIG. 4 is a symbolic representation of the equivalent prior art DC transmission path.

Long line carrier systems are used to transmit signal information great distances. Intra- or intercontinental transmission may be by means of land based or submarine cable, respectively.

FIG. 1 is exemplary of a land based carrier system in which the transmitter 10 and receiver 14 are interconnected by a transmission line. The transmitted signal is attenuated and distorted during transmission. Consequently, repeater stations may be employed along the line to compensate for this distortion. These repeater stations are, in part, amplifiers and require DC power. This power is supplied to the repeaters by a series of power stations illustratively shown as 11, 12 and 13 connected to the transmission line. Each power station serves a number of repeaters, the number being determined by the power dissipated in the transmission line and repeater stations and the current drawn from the power station which is limited by the resistance of the elements served by the power station since the maximum line voltage is limited. Therefore, the distance between power stations is determined by the number of repeater stations that can be served. The transmission system expense and complexity increase and the reliability decreases as the number of power stations increase.

FIG. 1A illustrates an underwater transmission system in which the transmitter 15 is connected to the receiver 17 by means of a submarine cable. The transmitted signal is attenuated and distorted along the transmission path and, consequently, repeaters may be used to compensate for the losses. In submarine cable systems, the power utilized by the repeaters must be supplied at each end by high voltage supplies 17 and 18.

FIG. 2 illustrates a series of prior art repeaters 21, 23 and 25. The amplifiers 27, 28 and 29, included as part of the repeaters, compensate for the distortion and attenuation caused by the transmission line between repeaters. Thus, the distance between repeaters is determined, in part, by the transmission characteristics of the line. The DC power supplied by the power stations and the transmitted signal are simultaneously carried along the transmission line 20. The DC power is separated from the transmitted signal at each repeater station and supplied to the repeaters. The power is supplied to each repeater through the repeater power input circuit. Voltage is developed across resistors 22, 24 and 26 which are connected across the power input circuits of respective amplifiers 27, 28 and 29. These power input circuits also supply the repeaters 21, 23 and 25 since the amplifiers 27, 28 and 29 are a part of the respective repeaters 21, 23 and 25. A more detailed diagram of an exemplary prior art repeater is shown in FIG. 3.

Each repeater includes input and output transformers 32 and 33, respectively. The input winding of input transformer 32 is connected to the transmission line while the output winding of the input transformer is connected to the input circuit of the amplifier 27. The input winding of the output transformer 33 is connected to the output circuit of amplifier 27 while the output output winding thereof is connected to the transmission line. One method of deriving the DC power carried along the transmission line is to tap the input winding of the input transformer at point 30. This power is then supplied to amplifier 27 by means of the voltage developed across resistor 22, which is connected to the power input circuit of amplifier 27. The DC power is then supplied to the transmission line for transmission to the next repeater through connection point 31 of the output winding of the output transformer 33.

Figure 5:
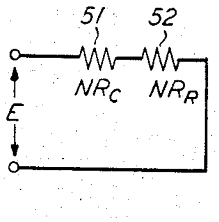
FIG. 5 is a symbolic representation of the equivalent prior art DC transmission path in which like resistances have been combined.

The equivalent DC transmission path for the prior art transmission line is shown in FIG. 4. A voltage E is supplied to resistors 40, 42, and 44, which symbolically represent the cable resistance ($R_c$), and 41, 43, and 45, which represent the input resistance of the power input circuit of the amplifier ($R_R$). The cable and repeater resistances ($R_c$ and $R_R$, respectively), are connected in series. A simplified symbolic representation of the equivalent DC transmission path is shown in FIG. 5, in which like elements along the equivalent DC transmission path have been combined. A voltage E is applied to a series connection of two resistors 51 and 52. Resistor 51 ($R_c$) symbolically represents the combined cable resistances while resistor 52 ($R_R$) symbolically represents the combined input resistances of the power input circuit. The maximum voltage that can be carried by the line is fixed because of the elements' breakdown voltage and safety considerations. Consequently, the maximum current that can be drawn from the local power station is $$\frac{E}{N(R_c+R_R)}$$

Therefore, the maximum power that may be supplied by the power station is $$\frac{E^2}{N(R_c+R_R)}$$

Figure 6:
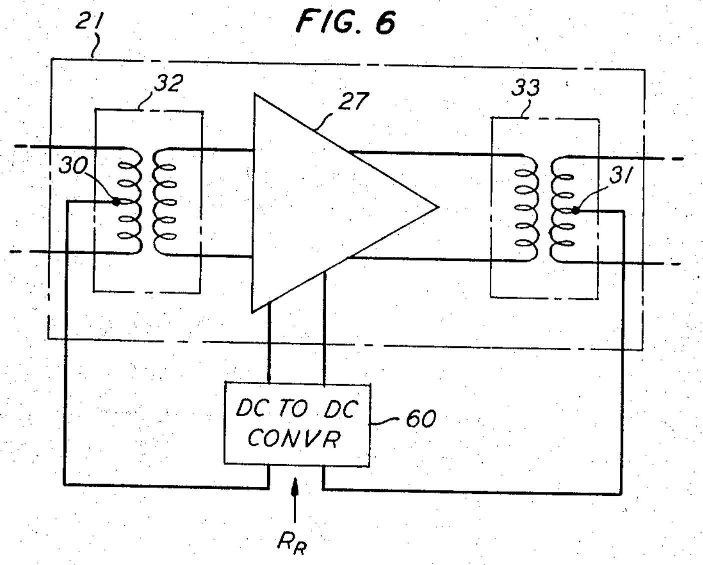
FIG. 6 illustrates an embodiment of the present invention in which a single repeater is associated with a DC to DC converter.

FIG. 6 illustrates the application of one of the principles of the present invention in which a DC to DC converter is associated with the power input circuit of each repeater. The converter is used to modify the resistance of the power input circuit. FIG. 6 illustrates the above with reference to only one repeater, but it is to be understood that the principle may be applied to more than one repeater, and may be applied to each repeater along the transmission line. It is to be noted that FIG. 6 is similar to FIG. 3 except that the DC to DC converter 60 has been substituted for resistor 22. The DC power carried along the line is derived at center-tapped point 30 of input transformer 32. This power is supplied on one input terminal of the DC to DC converter. The DC to DC converter may be designed so that the impedance of the cable is matched, thus permitting maximum power to be transferred to the repeater 27. The output terminals of the converter are connected to the power input circuit of the repeater. The DC power is again supplied to the transmission line by way of a second input terminal of the converter being connected to point 31 on the output winding of output transformer 33.

Figure 7:
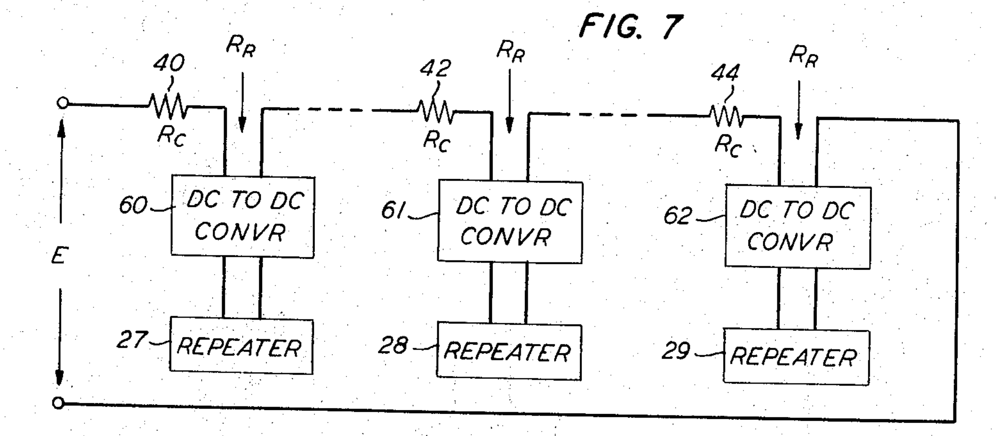
FIG. 7 is a symbolic representation of the equivalent DC transmission path when a DC to DC converter is associated with each repeater in accordance with a principle of the invention.

FIG. 7 illustrates an equivalent DC transmission path where each repeater power input icrcuit is associated with a DC to DC converter. A voltage E is applied to a series connection of cable resistances 40, 42, and 44 (symbolically designated $R_c$) interlaced by the power input circuits of repeaters 27, 28, and 29 supplied through DC to DC converters 60, 61, and 62. The DC to DC converter is used to modify the resistance of the power input circuit ($R_R$) and may be used to match the resistnce of the power input circuit resistance of the cable ($R_c$).

Figure 8:
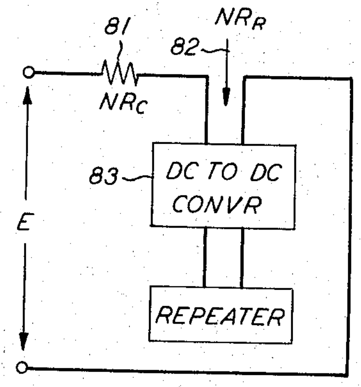
FIG. 8 is a symbolic representation of the equivalent DC transmission path when a DC to DC converter is associated with each repeater in which like elements have been combined.

FIG. 8 is a simplified representation of FIG. 7 in that similar elements of FIG. 7 have been grouped together. A voltage E is applied to the series combination of the lumped cable 81 ($NR_c$) and power input circuit resistances 82 ($NR_R$) where $NR_R$ represents the reflected resistance of the power input circuit. Maximum power will be transferred when the DC converter 83 is used to match the resistance of the power input circuit to the cable resistance. By increasing the power transferred to each repeater there is a corresponding maximum utilization of the power supplied by each power station. Consequently, it is possible to decrease the number of power stations required along the transmission line.

Power is consumed along the transmission line, as stated above, by the cable resistance and repeater stations. The power dissipated by the cable resistance is wasted while the power consumed by the repeater is used for amplification. A reduction of power consumption in the cable resistance would correspondingly decrease the number of power stations required along the line or, in the alternative, increase the power available to each repeater. By employing an additional DC to DC converter with each repeater section along the transmission path, the voltage to the repeater section may be boosted to the maximum permissible and the current level may be decreased, thus reducing the cable resistance power consumption.

The additional DC to DC converter may serve to draw more power from the power station. As shown above, prior art power feed stations could only supply power that was limited by the total repeater and cable resistance served. This was shown to be $$\frac{E^2}{N(R_R+R_c)}$$

The additional shunt converter may serve to isolate the cable and repeater resistances following the first stage from the power station. Therefore, the current drawn from the power station will only be presented with the cable resistance, the repeater power input circuit resistance of the first stage and the additional input resistance of the first stage. The new current can be represented by $$\frac{E}{R_c+R_R+R_{cv}}$$

where $R_{cv}$ represents the input resistance of the additional converter. Since each repeater power input circuit resistance can be modified, $R_R+R_{cv}$ may be made equal to the previous $R_R$. Therefore, the power drawn from the power feed station may be approximately $$\frac{E^2}{R_c+R_R}$$

The power drawn from the power feed station may be increased by a factor of N, where N represents the original number of repeater setions served by the power feed station. Since more power is drawn from each power feed station, more repeater sections can be served by each power station. Therefore, the length of repeated transmission line that can be served may be increased. In the alternative, the length could remain the same and more power be made available to each repeater. Any combination of the above two modifications may be possible.

Figure 9:
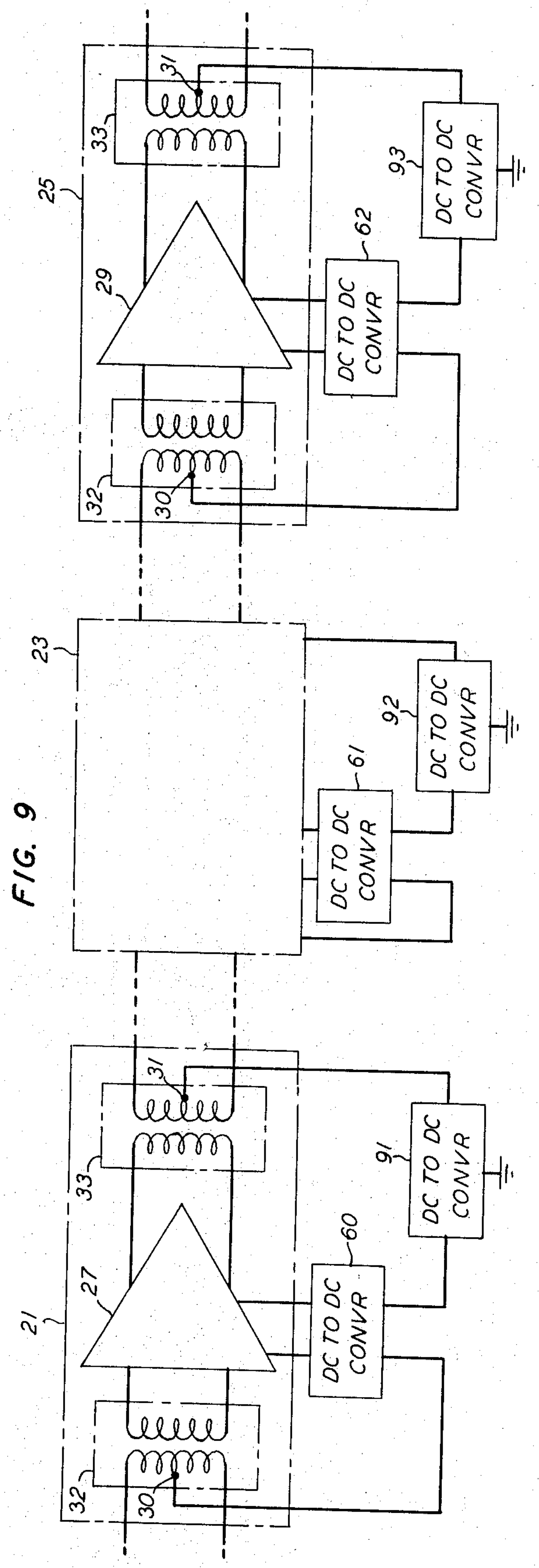
FIG. 9 illustrates an embodiment of the present invention in which each repeater in a series of repeaters is associated with a DC to DC converter and an additional DC to DC converter is inserted in the DC transmission path.

These above modifications may be more clearly understood by referring to FIG. 9 which illustrates a series of repeaters with DC to DC converter associated with each repeater power input circuit and an additional DC to DC converter associated with each repeater in the transmission path. A series of repeaters 21, 23, and 25 with a respective DC to DC converter 60, 61, and 62 connected to the power input circuit of each repeater are connected by the transmission line. Each repeater station operates in accordance with the principles set forth with respect to FIG. 6. An additional DC to DC converter 91, 92, and 93 is associated with each repeater section and is inserted in the DC transmission path. The additional DC to DC converter is connected between tap point 31 of the output winding of the input transformer 32 and the DC to DC converter associated with each repeater power input circuit. The current at the output is less than the input current while the output voltage is greater than the input voltage. The decrease in current level provides for a decrease in the $I^2R$ loss in the repeater section subsequent to the additional DC to DC converter.

Figure 10:
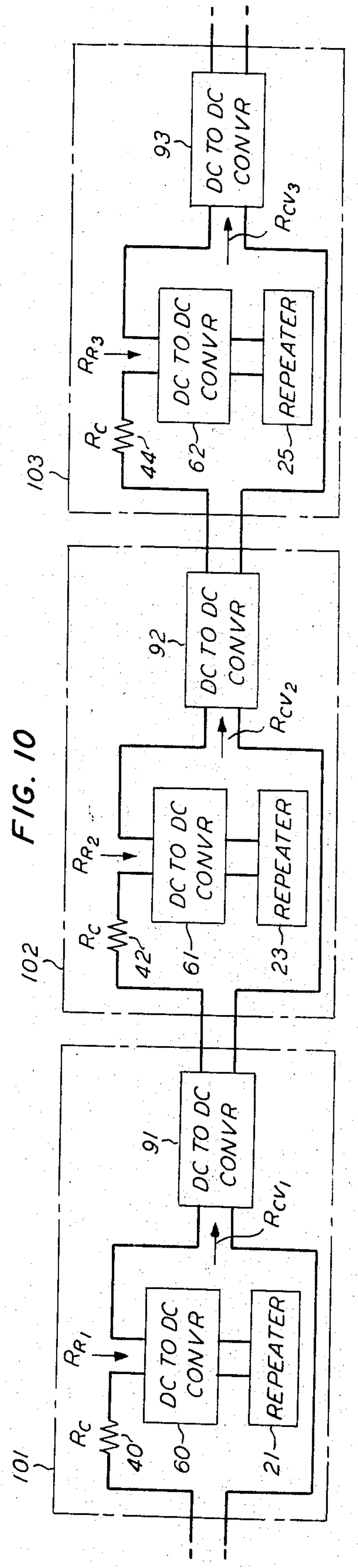
FIG. 10 is a symbolic representation of the equivalent DC transmission path of the system depicted in FIG. 9.

FIG. 10 is a symbolic representation of the equivalent DC transmission path of the system depicted in FIG. 9. Voltage E supplied by the power source is applied to the transmission line using DC to DC converters. The transmission line comprises a series of repeater sections illustratively shown as 101, 102, and 103. Voltage E is applied to the first repeater section 101. One side of the cable is connected to the power station and the other side of the cable is connected to the DC to DC converter 60 associated with the power input circuit of repeater 21. The DC to DC converter 60 is connected to an additional DC to DC converter 91.

The cable resistance ($R_c$) 40 is connected in series with the repeater power input circuit resistance ($R_{R1}$), as modified by the DC to DC converter 60. These two resistances are connected in series with the input resistance ($R_{cv_1}$) of the additional DC to DC converter 91. The current flowing in the first repeater section is $$\frac{E}{R_c+R_{R1}+R_{cv}}$$

The power delivered by the power feed station to the first repeater section is $$\frac{E^2}{R_c+R_{R1}+R_{cv_1}}$$

In order to obtain maximum power transfer to the elements following the cable resistance $R_c$, the series resistance comprising the repeater power input circuit resistance ($R_{R_1}$) as modified by the DC to DC converter 60 and the input resistance of the additional DC to DC converter $R_{cv_1}$ may be made equal to the cable resistance $R_c$. Therefore, the power delivered to the first repeater section by the power source is $E^2/2R_c$. This power level is much greater than that drawn from the power source when supplying prior art devices. There, the power was shown to be $$\frac{E^2}{N(R_c+R_R)}$$

Since the number of repeater stations served by prior art systems is much greater than one, the present system, as shown in FIG. 10, serves to draw more power from each power station.

The relationship between $R_{R_1}$ and $R_{cv_1}$ in the first section is chosen so to provide enough power to the repeater with the remainder being supplied by the additional DC to DC converter 91 to the next repeater section. DC to DC converter 91 boosts the voltage level to the maximum permissible E.

The voltage E is supplied to the following repeater section. The additional DC to DC converter while boosting the voltage to level E correspondingly decreases the current available to the following repeater section. The power delivered to the additional DC to DC converter comprises the voltage drop across it and the current flowing through it. Assuming an ideal converter with a 100% efficiency level, the power delivered by the converter will be equal to the power received by it. Since the received power includes a voltage component less than E at a current level of $E/2R_c$, the converter by boosting its output voltage E must decrease the current supplied by it to less than $E/2R_c$. The decrease in current levels in succeeding repeater sections causes lower $I^2R_c$ loss than previously encountered in prior art systems.

In repeater section 102, the repeater power input circuit resistance ($R_{R2}$) as modified by the DC to DC converter 61 and the input resistance $R_{cv2}$ of the additional DC to DC converter 92 may be designed so as to draw the full current available from the DC to DC converter 91. The same design considerations may be applied to succeeding repeater sections.

While the embodiment of the principles of the present invention show an additional DC to DC converter associated with each repeater section, the benefits deriving from its use may be derived by having fewer additional DC to DC converters than repeater sections.

The use of the additional DC to DC converter permits more power to be drawn from each local power station and also, in part, causes a decrease in the cable resistance power consumption encountered along the transmission line. Both of these benefits enable the owner feed station to supply more power to each repeater or, in the alternative, supply more repeaters, thus extending the range of each power feed station. The desirability of both of these benefits has been enumerated above.

It is to be understood that the embodiments of the invention which have been described are merely illustrative of the application of the principles of the invention. Numerous modifications may readily be devised by those skilled in the art without departing from the spirit and scope of the invention.

What is claimed is:

1. In combination, a transmission line connected between transmitting and receiving stations, a plurality of repeaters spaced along said transmission line with each repeater including a power input circuit, said transmission line carrying electrical information between said transmitting and receiving stations while simultaneously carrying direct electrical energy to be supplied to said repeaters, a plurality of first DC to DC converters, respective ones of said first converters connected between said transmission line and the power input circuits of respective ones of said repeaters to increase the direct electrical energy transferred to said repeaters, and at least one additional second DC to DC converter connected in the transmission path to increase the power available to each repeater.

2. Apparatus as set forth in claim 1 wherein there are an equal number of repeaters and additional second DC to DC converters.

3. Apparatus as set forth in claim 2 wherein each of said repeaters has associated therewith an individual one of said plurality of first DC to DC converters, an individual one of said additional second DC to DC converters, an input and an output transformer each having an input and an output winding, means connecting the input winding of said input transformer and the output winding of said output transformer to said transmission line, means connecting the output winding of said input transformer and the input winding of said output transformer to said repeater, means connecting a first input terminal of said individual first DC to DC converter to said input winding of said input transformer to supply said direct electrical energy to said first and additional second DC to DC converters, means connecting the first and second output terminals of said individual first DC to DC converter to said power input terminals of said repeater, means connecting the second input terminal of said individual first DC to DC converter to the input terminal of said individual additional second DC to DC converter, and means connecting the output terminal of said individual additional second DC to DC converter to said output winding of said output transformer.

4. In combination, a transmission line connected between transmitting and receiving stations, a plurality of sources of DC power connected to said transmission line with each source separated by a distance, a plurality of repeaters spaced along said transmission line, said transmission line carrying electrical information between said transmitting and receiving stations while simultaneously carrying said DC power to be supplied to said repeaters with each of said repeaters including a power input circuit, a plurality of first DC to DC converters, respective ones of said first converters connected between said transmission line and the power input circuits of respective ones of said repeaters, and at least one additional second DC to DC converter connected in the transmission path of said transmission line to increase the power drawn from each source of DC power while maintaining the power supplied to each repeater constant so as to increase the length of repeatered transmission line supplied by said sources of DC power.

5. Apparatus as set forth in claim 4 wherein there are an equal number of repeaters and additional second DC to DC converters.

6. Apparatus as set forth in claim 5 wherein each of said repeaters has associated therewith an individual one of said plurality of first DC to DC converters, an individual one of said additional second DC to DC converters, an input and an output transformer each having an input and an output winding, means connecting the input winding of said input transformer and the output winding of said output transformer to said transmission line, means connecting the output winding of said input transformer and the input winding of said output transformer to said repeater, means connecting a first input terminal of said individual first DC to DC converter to said input winding of said input transformer to supply said direct electrical energy to said first and additional second DC to DC connverters, means connecting the first and second output terminals of said individual first DC to DC converter to said power input terminals of said repeater, means connecting the second input terminal of said individual first DC to DC converter to the input terminal of said individual additional second DC to DC converter, and means connecting the output terminal of said individual additional second DC to DC converter ot said output winding of said output transformer.

References Cited

UNITED STATES PATENTS

| | | | |
|---|---|---|---|
| 3,459,895 | 8/1969 | Ebhardt | 179—2.5 |
| 1,950,127 | 3/1934 | Strieby | 179—170 |
| 2,208,417 | 7/1940 | Gilbert | 179—170 |
| 3,230,382 | 1/1966 | Burns et al. | 307—82 |

KATHLEEN H. CLAFFY, Primary Examiner

W. A. HELVESTINE, Assistant Examiner

U.S. Cl. X.R.

307—82